US008296722B2

(12) United States Patent
Yoshihama et al.

(10) Patent No.: US 8,296,722 B2
(45) Date of Patent: Oct. 23, 2012

(54) CRAWLING OF OBJECT MODEL USING TRANSFORMATION GRAPH

(75) Inventors: Sachiko Yoshihama, Kanagawa-ken (JP); Shinya Kawanaka, Tokyo (JP); Takaaki Tateishi, Kanagawa-ken (JP); Ory Segal, Tel Aviv (IL); Adi Sharabani, Ramat Gan (IL); Marco Pistoia, Amawalk, NY (US); Guy Podjarny, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/246,065

(22) Filed: Oct. 6, 2008

(65) Prior Publication Data

US 2010/0088668 A1    Apr. 8, 2010

(51) Int. Cl.
*G06F 9/44* (2006.01)
(52) U.S. Cl. ......... 717/104; 717/105; 717/109; 717/121
(58) Field of Classification Search .................. None
See application file for complete search history.

(56) References Cited

U.S. PATENT DOCUMENTS

| | | | | |
|---|---|---|---|---|
| 6,182,085 B1 * | 1/2001 | Eichstaedt et al. | ............ | 709/201 |
| 7,143,088 B2 * | 11/2006 | Green et al. | ............ | 1/1 |
| 7,350,187 B1 * | 3/2008 | Tong et al. | ............ | 717/109 |
| 7,483,970 B2 * | 1/2009 | Anuszczyk et al. | .......... | 717/104 |
| 7,536,389 B1 * | 5/2009 | Prabhakar et al. | ............ | 1/1 |
| 7,584,194 B2 * | 9/2009 | Tuttle et al. | ............ | 715/234 |
| 7,599,931 B2 * | 10/2009 | Shi et al. | ............ | 1/1 |
| 7,685,576 B2 * | 3/2010 | Hartmann et al. | ............ | 717/105 |
| 7,788,654 B2 * | 8/2010 | Kostoulas et al. | ............ | 717/109 |
| 7,854,194 B2 * | 12/2010 | Siu et al. | ............ | 99/510 |
| 7,917,889 B2 * | 3/2011 | Devarakonda et al. | ........ | 717/121 |
| 2004/0128285 A1 * | 7/2004 | Green et al. | ............ | 707/3 |
| 2004/0205049 A1 * | 10/2004 | Aggarwal | ............ | 707/3 |
| 2004/0221265 A1 * | 11/2004 | Leung et al. | ............ | 717/104 |
| 2005/0257190 A1 * | 11/2005 | Shaburov et al. | ............ | 717/121 |
| 2006/0230011 A1 * | 10/2006 | Tuttle et al. | ............ | 706/62 |
| 2007/0294661 A1 * | 12/2007 | Devarakonda et al. | ........ | 717/104 |
| 2008/0097977 A1 * | 4/2008 | Broder et al. | ............ | 707/4 |
| 2008/0229277 A1 * | 9/2008 | Devarakonda et al. | ........ | 717/104 |
| 2008/0313119 A1 * | 12/2008 | Leskovec et al. | ............ | 706/46 |
| 2009/0024556 A1 * | 1/2009 | Hirsch | ............ | 706/55 |

(Continued)

OTHER PUBLICATIONS

Mesbah et al., "Crawling AJAX by Inferring User Interface State Changes", IEEE, Jul. 25, 2008, pp. 122-134.*

(Continued)

*Primary Examiner* — Thuy Dao
*Assistant Examiner* — Ben C Wang
(74) *Attorney, Agent, or Firm* — Vazken Alexanian

(57) ABSTRACT

A transformation tree for an object model (OM) is defined. The transformation tree has nodes interconnected by edges, where each node is connected to at most one other tree node. Each node corresponds to a state of the OM; each edge corresponds to an event causing the OM to transition from the state of one node to the state of another node. A transformation graph for the OM is constructed by simulating the transformation tree. The transformation graph has nodes interconnected by edges, and is a directed graph in which each node is connected to one or more other nodes. Each node corresponds to a state of the OM; each edge corresponds to an event causing the OM to transition from the state of one node to the state of another node. Crawling-oriented actions are performed in relation to the OM by being performed in relation to the transformation graph.

20 Claims, 10 Drawing Sheets

U.S. PATENT DOCUMENTS

| | | | |
|---|---|---|---|
| 2009/0204582 A1* | 8/2009 | Grandhi et al. | 707/3 |
| 2010/0088668 A1* | 4/2010 | Yoshihama et al. | 717/105 |
| 2010/0138925 A1* | 6/2010 | Barai et al. | 726/25 |
| 2010/0211927 A1* | 8/2010 | Cai et al. | 717/104 |
| 2010/0228731 A1* | 9/2010 | Gollapudi | 707/737 |
| 2010/0268701 A1* | 10/2010 | Zhang et al. | 707/709 |
| 2011/0016359 A1* | 1/2011 | Kawanaka et al. | 714/38 |
| 2011/0066609 A1* | 3/2011 | Ashkenazi et al. | 707/709 |
| 2012/0011489 A1* | 1/2012 | Murthy et al. | 717/126 |
| 2012/0016862 A1* | 1/2012 | Rajan | 707/710 |
| 2012/0117534 A1* | 5/2012 | Hershenson et al. | 717/105 |

OTHER PUBLICATIONS

Zhu et al., "Using Markov Chains for Link Prediction in Adaptive Web Sites", 2002 Springer-Verlag Berlin Heidelberg, pp. 60-73.*

Huang et al., "A testing framework for Web application security assessment", 2005 Elsevier B.V., pp. 739-761.*

* cited by examiner

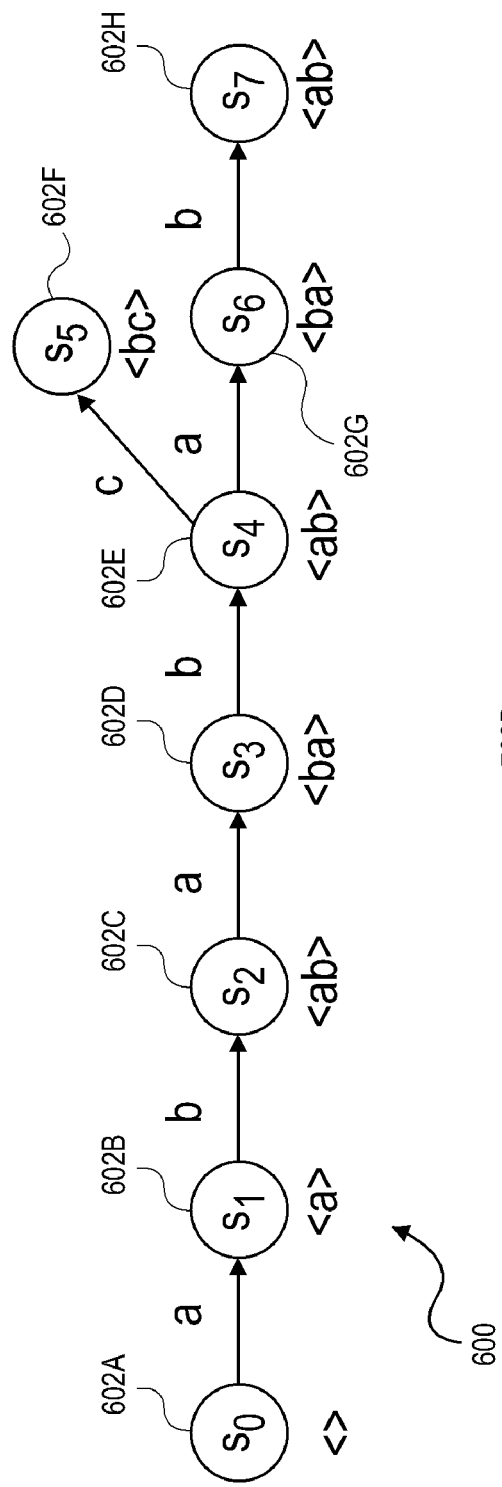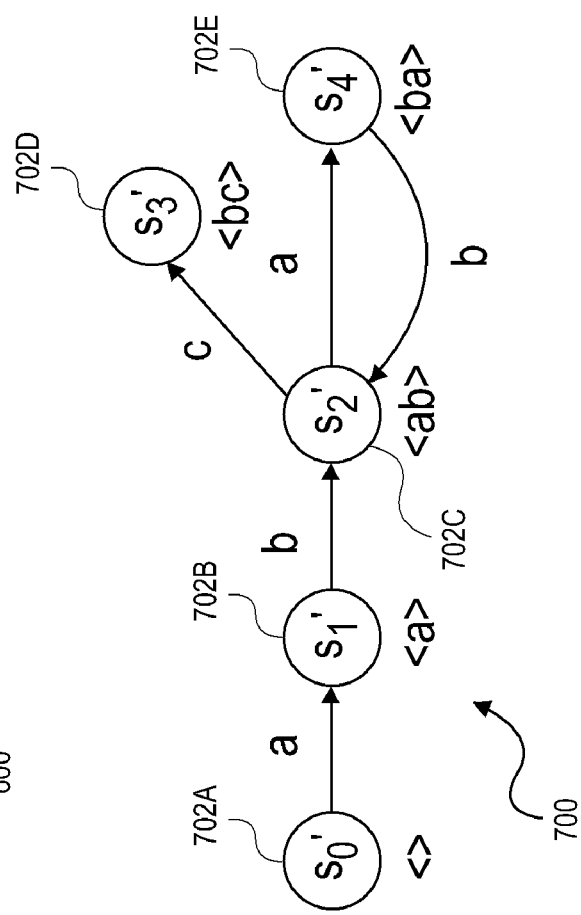

FIG. 8

```
INPUT: a HTML document
OUTPUT: Dom Transition Graph (DTG)

Parse a HTML document to make an initial DOM
state, extract and execute scripts.
s₀ : a fresh state of DTG
Q : queue
L (⊆ S → Λ) : labeling function (Λ is a set of
labels)
V : a set of visited labels
D : depth of state DOM(s₀) := a DOM state after the initial script is
executed.
Q.push(s₀); V :={L(s₀) }; D(s₀) := 0;

While (! Q.empty?) {
  s := Q.pop();
  if (D(s) > Threshold) {continue; }
  for (e in all event handlers of s) {
    t := a fresh state of DTG   /* s → [e] t */
    execute e on DOM(s)
    DOM(t):=the DOM state after e is executed
    if (not (L(t) ∈ V)) {
      V := {L(t)} U V;
      D(t) := D(s) + 1;
      Q.push(t);
    }
  }
}
```

800

US 8,296,722 B2

CRAWLING OF OBJECT MODEL USING TRANSFORMATION GRAPH

FIELD OF THE INVENTION

The present invention relates generally to object models, such as document object models (DOM's) for Internet web sites, and more particularly to constructing transformation graphs for such object models to improve crawling of the models.

BACKGROUND OF THE INVENTION

Internet web sites are vulnerable to a number of different security vulnerabilities. Such security vulnerabilities can include malware, such as cross-site scripting (XSS) and cross-site request forgery (CSRF), as well as other types of security vulnerabilities. Therefore, operators of web sites commonly attempt to determine whether their web sites are vulnerable in this way.

One way to determine whether a web site is vulnerable is to employ a vulnerability scanner. Such a scanner includes crawling functionality that collects all the universal resource locator (URL) addresses of the web site and that may become the targets of attackers. To collect the URL addresses, a scanner loads the top page of a web site, and scans the web site to collect URL addresses within this web page that refer to other web pages within the same web site. This process is repeated at each web page, and is generally referred to as crawling. Each web page and its content can then be scanned for vulnerabilities.

However, such crawling of a web site is difficult for some types of web sites that employ web applications with complex client-side logic. For example, asynchronous JAVA and eXtended markup language (XML), or Ajax, technologies employ client-side JavaScript updates of the presentation of a web page by dynamically modifying the document object model (DOM) of the web site and its style sheet (such that the web site is considered to be dynamic). Other types of asynchronous communication also permit dynamic updates of data on a web page without having to reload the entire web page. JAVA is a trademark of Oracle Corporation, of Redwood Shores, Calif.

Crawling dynamic web sites employing such technologies is difficult, because the DOM of a dynamic web site is dynamically generated and modified at run-time. Thus, a web application at the same URL address may have different vulnerabilities that originate from different DOM states. The dynamic modification of the DOM can occur in any order, depending on how a user interacts with the web site in question. This flexible and dynamic nature of web applications renders them difficult to scan for security vulnerabilities, because there is not a static collection of URL addresses that a vulnerability scanner can crawl to look for such vulnerabilities.

For these and other reasons, there is a need for the present invention.

SUMMARY OF THE INVENTION

The present invention relates to the improved crawling of an object model by using a transformation graph. A method of one embodiment of the invention defines a transformation tree for an object model. The transformation tree has tree nodes connected to one another by tree edges, and is a directed acyclic graph in which each tree node is connected to at most one other tree node. Each tree node corresponds to a state of the object model, and each tree edge corresponds to an event causing the object model to transition from a state of one tree node to a state of another tree node.

The method constructs a transformation graph for the object model by simulating the transformation tree for the object model. The transformation graph has graph nodes connected to one another by graph edges. The transformation graph is a directed graph in which each graph node is connected to one or more other graph nodes. Each graph node corresponds to a state of the object model, and each graph edge corresponds to an event causing the object model to transition from a state of one graph node to a state of another graph node. The method performs one or more crawling-oriented actions in relation to the object model by performing the crawling-oriented actions in relation to the transformation graph for the object model that has been constructed. The method then displays results of the crawling-oriented actions performed in relation to the object model.

A computer-readable medium of an embodiment of the invention may be a tangible computer-readable medium, such as a recordable data storage medium. The computer-readable medium has stored thereon computer-executable instructions for defining a transformation tree for a document object model (DOM) representing a dynamic web site. The transformation tree has tree nodes connected to one another by tree edges, and is a directed acyclic graph in which each tree node is connected to at most one other tree node. Each tree node corresponds to a state of the DOM, and each tree edge corresponds to an event causing the DOM to transition from a state of one tree node to a state of another tree node.

The computer-readable medium further has stored thereon computer-executable instructions for constructing a transformation graph for the DOM by simulating the transformation tree for the DOM. The transformation graph has graph nodes connected to one another by graph edges, and is a directed graph in which each graph node is connected to one or more other graph nodes. Each graph node corresponds to a state of the DOM, and each graph edge corresponds to an event causing the DOM to transition from a state of one graph node to a state of another graph node. The computer-readable medium further has stored thereon computer-executable instructions for performing one or more crawling-oriented actions in relation to the DOM by performing the crawling-oriented actions in relation to the transformation graph for the DOM that has been constructed. These computer-executable instructions are also for displaying results of the crawling-oriented actions performed in relation to the DOM.

A computerized system of an embodiment of the invention includes hardware, and a number of components implemented via or by the hardware. A simulation component is to simulate a transformation tree for an object model. The transformation tree has tree nodes connected to one another by tree edges, and is a directed acyclic graph in which each tree node is connected to at most one other tree node. Each tree node corresponds to a state of the object model, and each tree edge corresponds to an event causing the object model to transition from a state of one tree node to a state of another tree node.

A construction component is to construct a transformation graph for the object model based on the transformation tree for the object model being simulated by the simulation component. The transformation graph has graph nodes connected to one another by graph edges, and is a directed graph in which each graph node is connected to one or more other graph nodes. Each graph node corresponds to a state of the object model, and each graph edge corresponds to an event causing the object model to transition from a state of one graph node to a state of another graph node.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a diagram of a representative example transformation tree, according to an embodiment of the present invention.

FIG. 7 is a diagram of a representative example transformation graph corresponding to the transformation tree of FIG. 6, according to an embodiment of the present invention.

FIG. 8 is a diagram of pseudocode that can be used to construct a transformation graph, according to an embodiment of the present invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In particular, it is noted that embodiments of the present invention are at least substantially described herein in relation to a document object model (DOM) for a dynamic web site. However, other embodiments can employ other types of object models for other type of data constructs, other than DOM's, and other than for dynamic web sites. For instance, one embodiment of the invention can pertain to a programming language model for a self-mutating computer program. In general, embodiments of the present invention are applicable to any type of model that is self-mutating or otherwise dynamic, where it may be difficult to crawl the state space of such a model.

Figure 1:
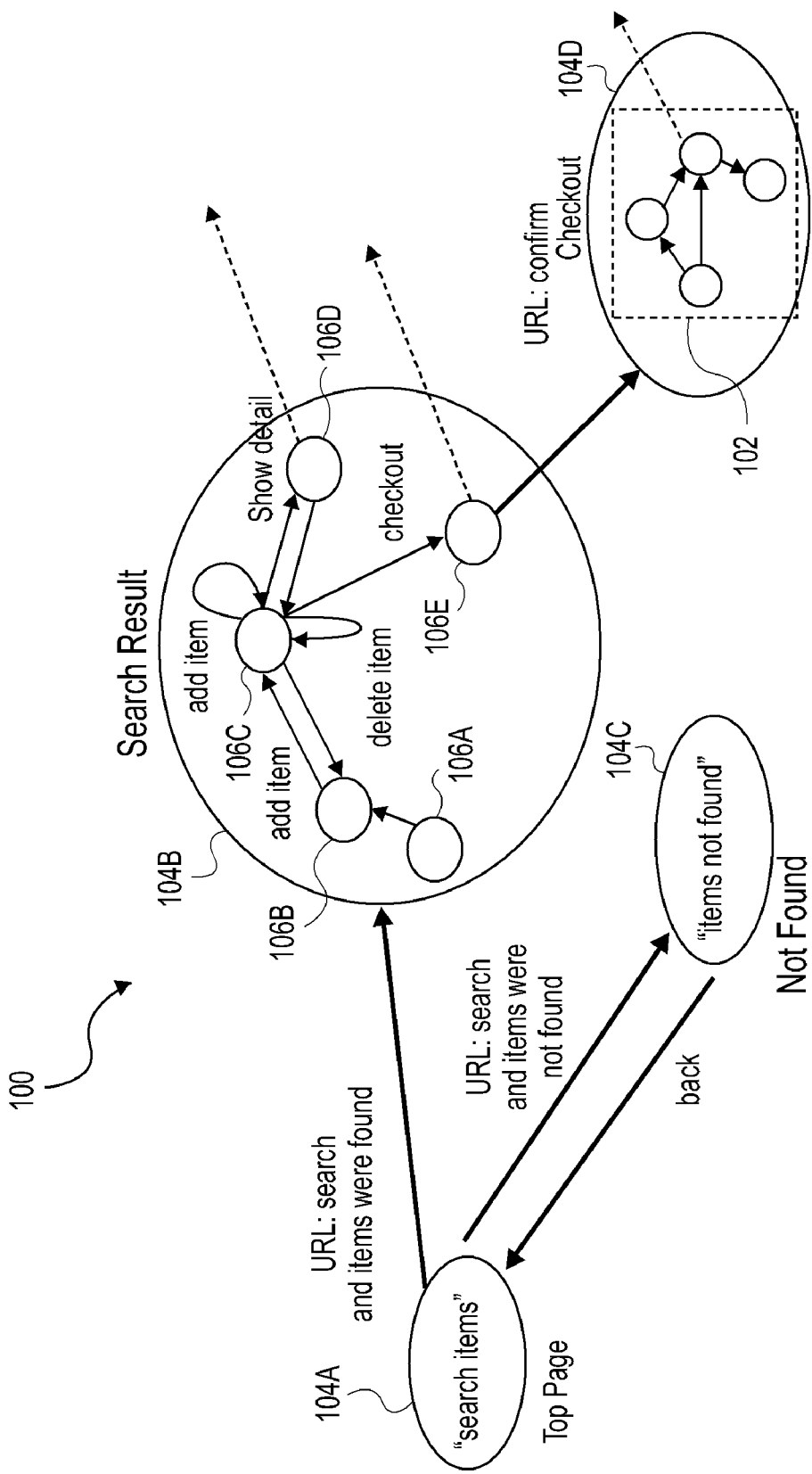
FIG. 1 is a diagram of an example web site application graph and a corresponding document object model (DOM) transformation graph, according to an embodiment of the present invention.

FIG. 1 shows a representative example web application graph 100 and a corresponding DOM transformation graph 102, according to an embodiment of the invention. Each of the nodes 104A, 104B, 104C, and 104D, collectively referred to as the nodes 104, is a web page represented by a universal resource locator (URL) address, and the internal condition of a web application. This application starts at the top page of node 104A, from which a user can input the name of the items he or she is interested in and select the "search" button. When the items are found, the web browser navigates to the search results page of node 104B, where the list of found items is presented.

The web page of node 104B is an asynchronous JAVA and eXtended markup language (XML), or Ajax, style client-side application, where the user may add the items to a shopping cart, view details of each item, or proceed to checkout of node 104D. Each of the nodes 106A, 106B, 106C, 106D, and 106E, collectively referred to as the nodes 106, within the node 104B represents a state of the DOM of the web site. Together, all the nodes 106 constitute a DOM transformation graph for the node 104B, which can be different than the DOM transformation graph 102 for the node 104D.

Figure 2:
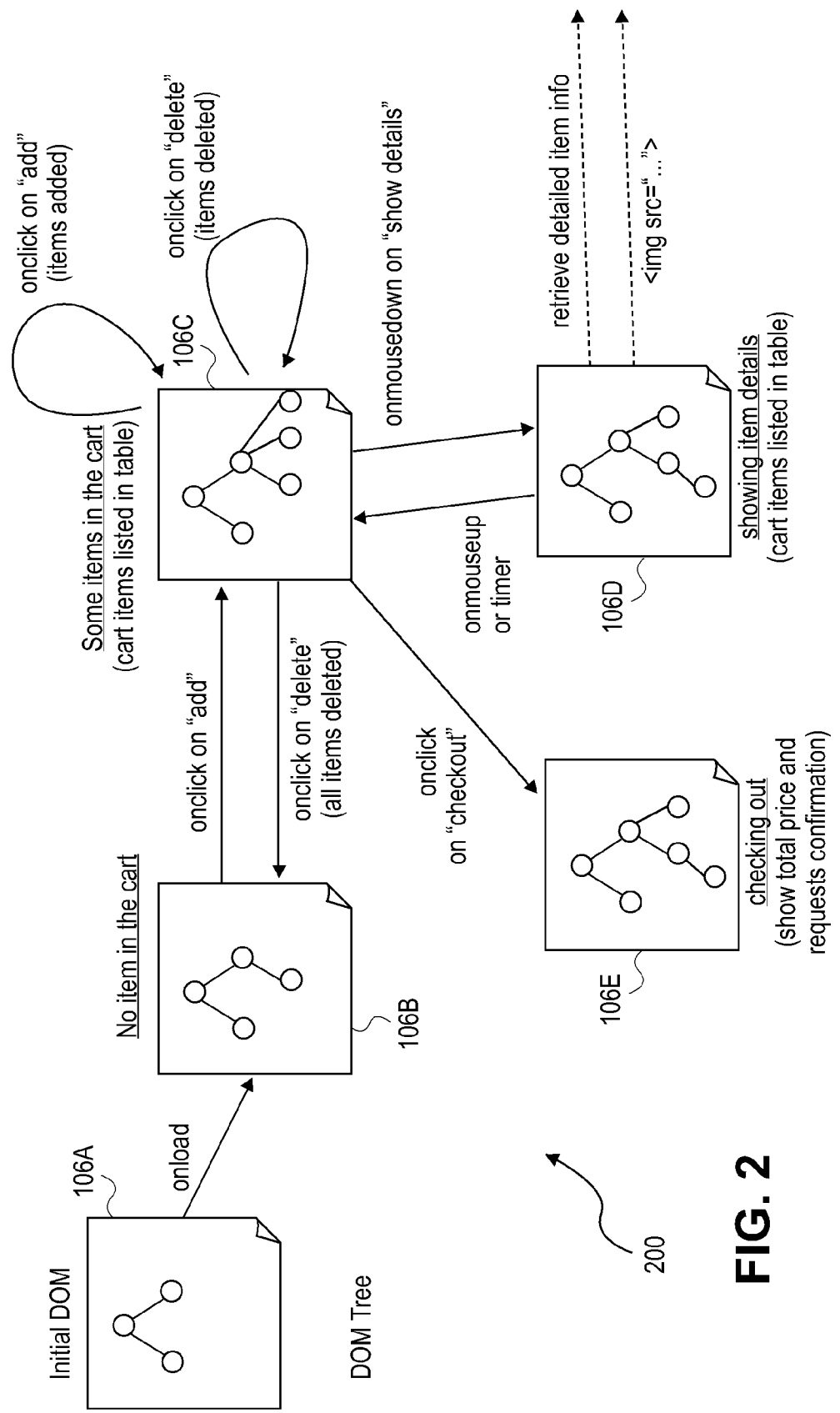
FIG. 2 is a diagram depicting a DOM transformation graph of FIG. 1 in more detail, according to an embodiment of the present invention.

FIG. 2 shows a DOM transformation graph 200 for the state of the node 104B of FIG. 1, according to an embodiment of the invention. The node 106A represents an initial DOM state after a web page has been loaded, and before the event "onload" has been executed. When the "onload" event occurs, the event handler in the web page is executed, and generates additional DOM nodes, such that the state of the DOM transitions to node 106B, in which the list of items is shown to the user, as well as an empty shopping cart. The user may click on an "add item" button on the web page to add an item into the shopping cart, at which point the event associated with this button is executed, such that the state of the DOM transitions to node 106C.

At node 106C, the user may continue clicking on the "add item" button to add more items into the shopping cart, resulting in the addition of a row into a hypertext markup language (HTML) table that represents the shopping cart. Alternatively, the user may click on a "delete" button that is associated with each item in the shopping cart. However, the state of the DOM remains at the node 106C so long as there are some items in the shopping cart. The state of the DOM reverts back to the node 106B if the cart becomes empty again.

At node 106C, the user may also click on a "show detail" icon on an item name to view the detailed specifications of the item in question, such that the web application initiates an asynchronous hypertext transport protocol (HTTP) request to the server to retrieve the item details. The details may be presented as a popup message at node 106D, and display of this message is removed when the mouse button is released. When the user clicks on a "checkout" button, the state of the DOM transitions to node 106E, where the total price of the items in the shopping cart is presented to the user. When the user finally clicks on a "confirm" button, the browser loads another URL address at the state of the DOM represented by the node 1 04D in FIG. 1.

Figure 3:
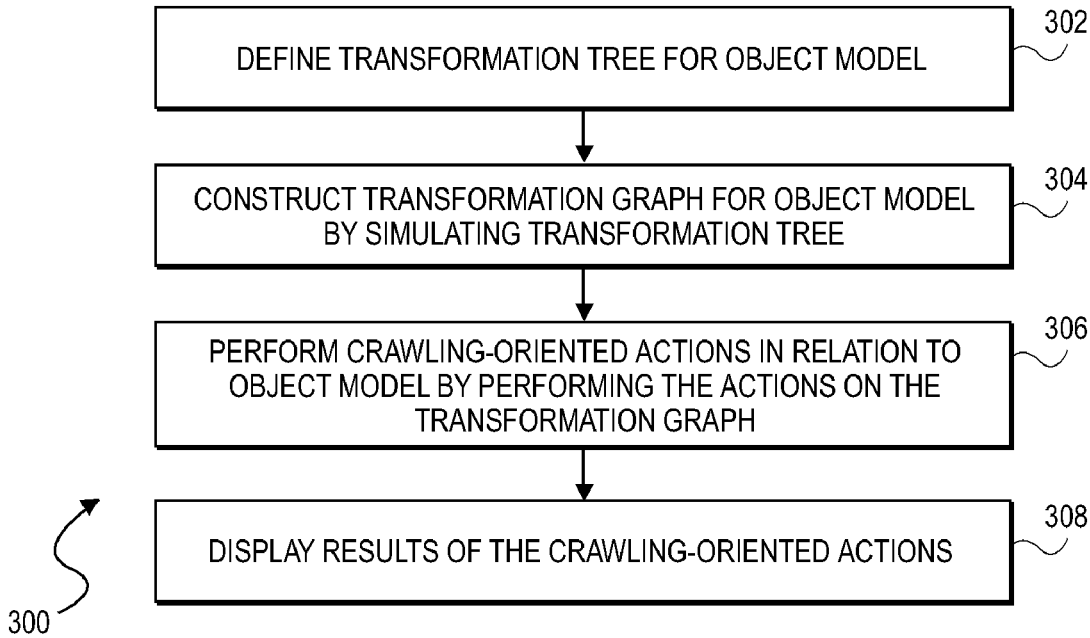
FIG. 3 is a flowchart of a method, according to an embodiment of the invention.

FIG. 3 shows a method 300, according to an embodiment of the invention. The method 300 may be implemented by computer-executable instructions stored on a computer-readable medium, such as a tangible computer-readable medium like a recordable data storage medium. In particular, each part of the method 300, as well as each part of other methods of embodiments of the invention, may be implemented by such computer-executable instructions.

A transformation tree is defined for an object model of a dynamic web site (302). The transformation tree has a number of tree nodes that are interconnected to one another by tree edges. The transformation tree is a directed acyclic graph in which there are no loops, and in which each tree node is connected to at most one other tree node. Each tree node corresponds to a state of the object model. Each tree edge corresponds to an event causing the object model to transition from the state of one tree node to which the tree edge is connected to the state of another tree node to which the tree edge is connected. (An event of an edge may correspond to a user-initiated JavaScript event, an intrinsic event such as a timer event, or another type of event.) A transformation tree is similar to a transformation graph. However, unlike a transformation graph, a transformation tree has a tree structure. As such, as described in the previous paragraph, the transitions do not have any loops, and each state has zero or one previous states.

Figure 4:
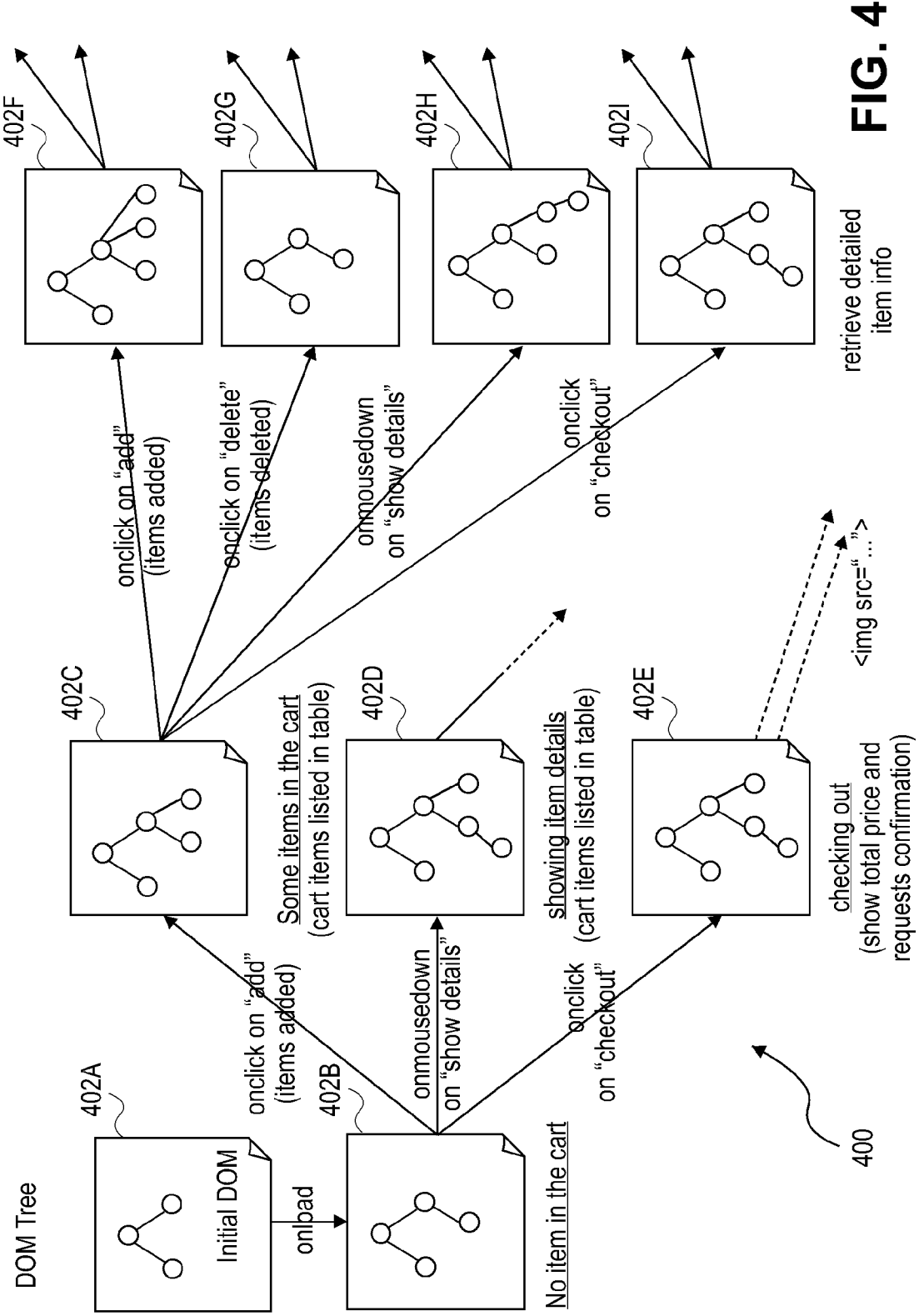
FIG. 4 is a diagram of an example transformation tree for an object model, according to an embodiment of the present invention.

FIG. 4 shows a transformation tree 400 that corresponds to the transformation graph 200 of FIG. 2, according to an embodiment of the invention. The transformation tree 400 includes tree nodes 402A, 402B, 402C, 402D, 402E, 402F, 402G, 402H, and 402I, collectively referred to as the tree nodes 402. The tree nodes 402 are connected to one another by tree edges, which are represented by arrows in FIG. 4. Each of the tree nodes 402 corresponds to a state of the object model in question. Thus, the state of the tree node 402A is the initial state corresponding to the state of the node 106A in FIG. 2.

The states of the tree nodes 402 of the transformation tree 400 are like the states of the graph nodes of a transformation graph, but they do not make any loops, and no states are shared by more than one transition. For example, the states of the nodes 402B and 402G may seem identical, but they are not merged in the transformation tree 400. The transformation tree 400 is generally constructed by exploring the state space of the object model in question naively, making state transitions at all possible event handlers, and identifying resulting object model states as unique states.

Referring back to FIG. 3, a transformation graph is constructed for the object model by simulating the transformation tree that has been constructed (304). In particular the state of each tree node of the transformation tree is simulated. The transformation graph has a number of graph nodes connected to one another by graph edges. The transformation graph is a directed graph that can have one or more loops. In the transformation graph, therefore, each graph node is connected to one or more other graph nodes, where each graph node corresponds to a state of the object model in question. Each graph edge corresponds to an event causing the object model to transition from the state of one graph node to which the graph edge in question is connected to the state of another graph node to which this graph edge is connected. (An event of an edge may correspond to a user-initiated JavaScript event, an intrinsic event such as a timer event, or another type of event.)

A labeling function L can be defined on the state of each node of the transformation graph and of the transformation tree. The label of the state s is denoted as $L(s)$. A transformation graph is said to simulate a transformation tree when the following condition holds. This condition is that for all states of the transformation tree, denoted by s, and for the states on the transformation graph, denoted by s', if $L(s)=L(s')$, then for any transition $s\rightarrow[e]t$ of the transformation tree, there exists a transition $s'\rightarrow[e]t'$ within the transformation graph, where $L(t)=L(t')$. In this condition, $s\rightarrow[e]t$ means that the state t can be transitioned to from the state s by the event e.

Figure 5:
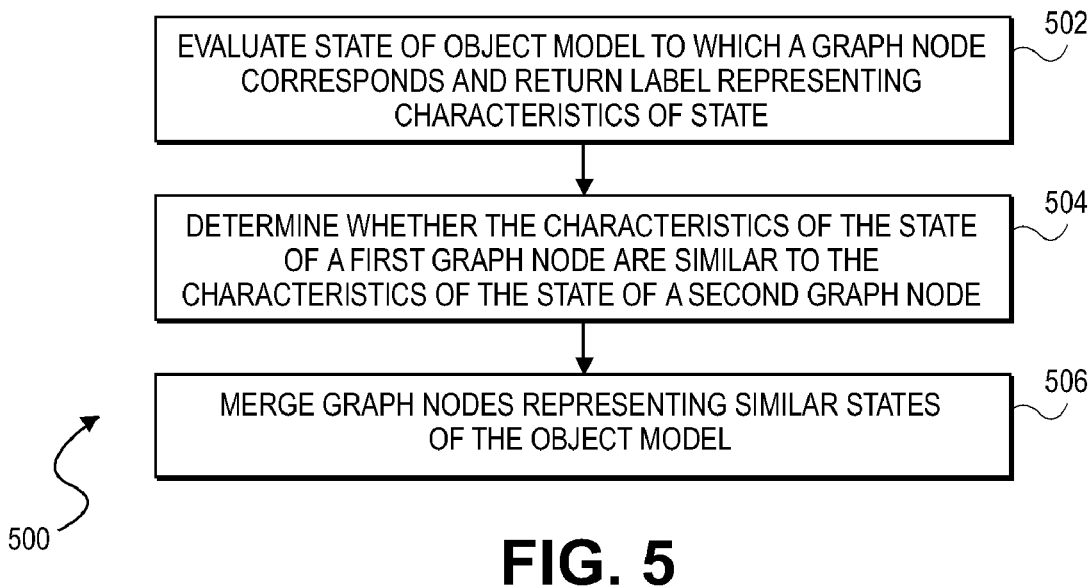
FIG. 5 is a flowchart of a method that can be employed to assist in constructing a transformation graph for an object model, according to an embodiment of the invention.

FIG. 5 shows a method 500 that can be employed in the construction of the transformation graph for the object model by simulating the transformation tree that has been constructed in part 304, according to an embodiment of the invention. For each graph node, the state of the object model to which this graph node corresponds is evaluated, and a label is returned that represents the characteristics of the state (502). This label is generated by the labeling function L that has been described in the previous paragraph, and the characteristics it represents include the edges that connect the state of the graph node in question.

Next, it is determined whether the characteristics of the state of any first graph node are similar to the characteristics of the state of any second graph node (504). That is, it is determined whether the output of the labeling function L of the state of any graph node is similar to the output of the labeling function L of the state of any other graph node. In one embodiment, similarity of two DOM states can be measured by any combination of one or more of the following criteria.

The first criterion includes the active properties of the web page in question. That is, the first criterion is whether the active properties of a web page corresponding to the DOM state represented by a first graph node are similar to active properties of a web page corresponding to the DOM state represented by a second graph node. Active properties of a web page are represented by a set of JavaScript code and event handlers in a DOM state, as well as a set of URL addresses to which HTTP requests may be issued from HTML or JavaScript within a given DOM state. In particular, what are compared are the object scope, the event handlers, and the scripts of the two DOM states to determine similarity as to this criterion.

The second criterion is the DOM structure similarity. That is, the second criterion is whether the structure of the DOM within the state of a first graph node is similar to the structure of the DOM within the state of a second graph node. Two DOM states are regarded as similar to one another when the DOM states have similar structures. Those of ordinary skill within the art can appreciate that a number of known techniques exist to determine whether the tree structure of one state is similar to the tree structure of another state as to this criterion.

The third criterion is script execution history. That is, the third criterion is whether the state of a first graph node resulted from script execution similar to the script execution that resulted in the state of a second graph node. Two DOM states are regarded as similar to one another when they are generated as a result of similar script execution. In order to compare script execution, a JavaScript engine may record script code execution.

This record of execution history can be referred to as a dynamic script fingerprint (DSFP). Each DSFP is a list of instructions executed when an event handler in JavaScript is activated and executed. This can include not only the immediate event handler but all subsequent code (or functions) that are called from the event handler code. Typically, the specific instructions, such as the invocation of built-in application programming interface (API) functions or access to built-in DOM properties are recorded. However, it may be chosen to record instructions at a finer granular order, such as the execution of user-defined JavaScript functions or even all byte code instructions.

Each DSFP corresponds to an edge in the transformation graph. As such, similarity of two DOM states can be assessed by the similarities of invocation of one event handler. However, in some situations, a sequence of the event handlers in a particular order may be regarded as an edge. In such instance, a sequence of multiple DSFP's may be considered to measure the similarity of DOM states. An approximation algorithm may also be employed—for instance, to ignore the looping execution of script code that does not have any effect on the similarity of the DOM states.

Each of these or other criteria can be converted into a numerical metric and aggregated in some manner to determine the similarity score of two graph nodes. Thus, graph nodes that represent similar states of the object model are merged together within the transformation graph (506). That is, if the similarity score is greater than a predetermined threshold, then the graph nodes are considered to be similar and are merged together. It is said that two DOM states s' and s" are merged into the state s if $L(s') \approx L(s'') \approx L(s)$, where the operator "$\approx$" implies similarity in accordance with some manner.

An example of simulation of a transformation tree to construct a transformation graph is presented by reference to FIGS. 6 and 7. FIG. 6 shows a representative example transformation tree 600, according to an embodiment of the invention. The tree 600 includes tree nodes 602A, 602B, 602C, 602D, 602E, 602F, 602G, and 602H, collectively referred to as the tree nodes 602. The tree nodes 602 are connected to one another by tree edges, which are represented by arrows in FIG. 6. FIG. 7 shows a representative example transformation graph 700 constructed by simulating the tree 600, according to an embodiment of the invention. The graph 700 includes graph nodes 702A, 702B, 702C, 702D, and 702E, collectively referred to as the graph nodes 702. The graph nodes 702 are connected to one another by graph edges, which are represented by arrows in FIG. 7.

The label of each state in FIGS. 6 and 7 is represented as <X>. There are five labels in FIGS. 6 and 7. Consider the states having the label <a>. The state $s_1$ is such a state on the transformation tree 600, and $s_1'$ is such a state on the transformation graph 700. The state $s_1$ has the transition $s_1 \rightarrow [b]s_2$, and the state $s_1'$ has the transition $s_1' \rightarrow [b]s_2'$. The labels of $s_2$ and $s_2'$ are thus the same, and the condition noted above holds on the states having the label <a>. On the states having the label <ab>, $s_2$, $s_4$, and $s_7$ are such states on the transformation tree 600, and $s_2'$ is such a state on the transformation graph 700. These states have transitions corresponding to the events [a] and [c]. The transitions having the event [a] within the transformation tree 600 are $s_2 \rightarrow [a]s_3$ and $s_4 \rightarrow [a]s_6$. The transition having the event [a] within the transformation graph 700 is $s_2' \rightarrow [a]s_4'$. The labels of these transitioned-to states are the same. For instance, $L(s_3) = L(s_6) = L(s_4') = $<ba>. The transitions having the event [c] are likewise similar. Therefore, on states having the label <ab>, the condition noted above holds. Indeed, the condition noted above holds for all states, such that the transformation graph 700 is said to simulate the transformation tree 600.

FIG. 8 shows representative pseudocode 800 that can be employed to parse an HTML document representing a transformation tree to generate a transformation graph for a DOM in part 304 of the method 300 of FIG. 3, according to an embodiment of the invention. It is noted that in some embodiments, the transformation graph does not simulate the transformation tree completely, because some states of the transformation tree may not be visited. For instance, in FIG. 8, the depth D(s) is provided to denote the number of node generation iterations have been reached in the resulting transformation graph, so that the pseudocode terminates generation when a predetermined threshold has been reached. That is, the transformation graph is constructed until a predetermined number of iterations of node generations have been achieved.

This is accomplished so that the pseudocode 800 always terminates, and does not fall into an infinite loop. In addition, or alternatively, a transformation graph state limit may be defined, corresponding to the maximum number of states within the transformation graph. As such, the pseudocode 800 terminates when the number of states reaches the state limit. That is, the transformation graph is constructed until a predetermined number of states of the object model within the transformation tree have been simulated.

Referring back to FIG. 3, once the transformation graph has been constructed, one or more crawling-oriented actions can be performed in relation to the object model by performing these actions on the transformation graph (306). For instance, the nodes of the transformation graph may have crawled to construct a list of all the unique nodes of the transformation graph, and in the case of a web site, for example, the state of each node may be tested for security vulnerabilities. Ultimately, the results of these actions are displayed for viewing by a user (308). As such, the user can take concrete and tangible actions in response, such as modifying the web site that corresponds to the object model, or otherwise modifying the dynamic object model, so that such security vulnerabilities or other aspects of the object model that have been highlighted by the actions can be corrected.

Figure 9:
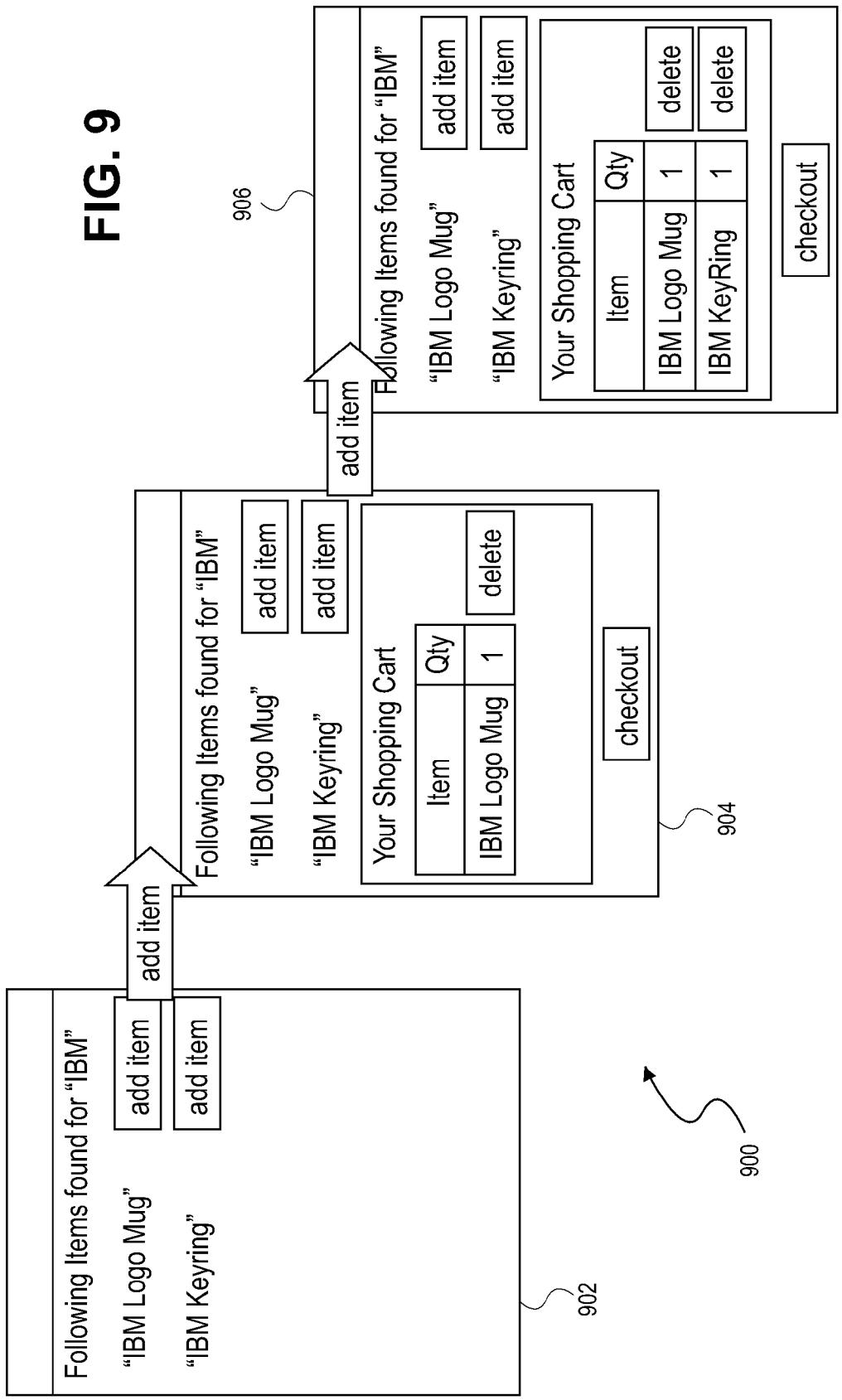
FIG. 9 is a diagram depicting sample execution of an example web application, according to an embodiment of the present invention.

FIG. 9 shows sample execution 900 of an example web application, according to an embodiment of the invention. For convenience, the sample execution 900 shows a subset of the DOM states within the example online application of FIG. 2. This example shows that two items were found as a result of a keyword search. The "add item" arrow indicates how the appearance of a web page changes as a result of selecting the "add item" button. When the "add item" button is selected, HTML elements and a txt node are created and appended to the DOM tree, as can be appreciated by those of ordinary skill within the art. Thus, from the web page 902, the user selects the logo mug item, resulting in the web page 904 being displayed, and from the web page 904, the user selects the key ring item, resulting in the web page 906 being displayed.

Figure 10:
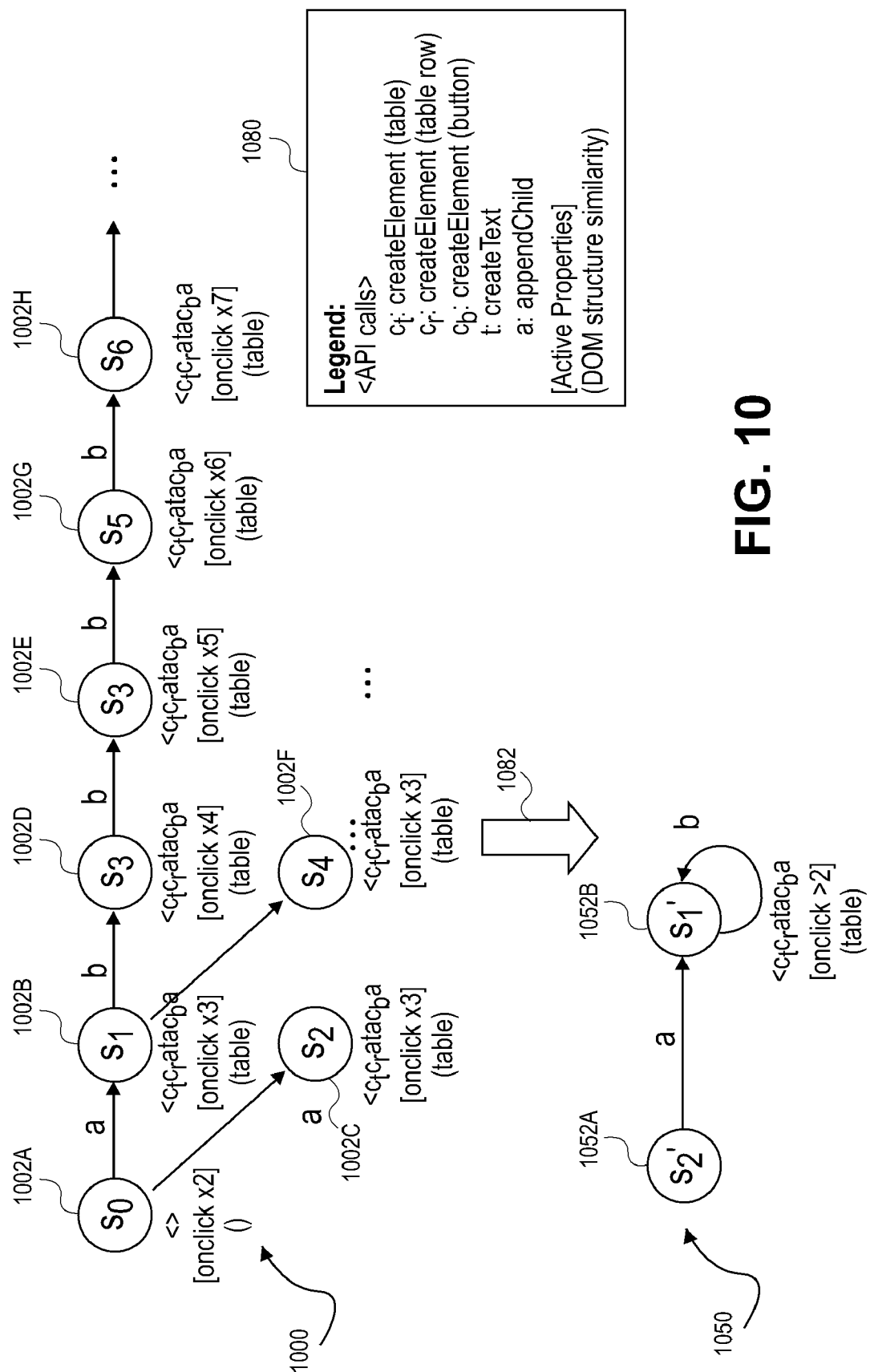
FIG. 10 is a diagram depicting the transformation tree and the transformation graph corresponding to the example web application of FIG. 9, according to an embodiment of the present invention.

FIG. 10 shows a transformation tree 1000 and a transformation graph 1050 corresponding to the example web application of FIG. 9, according to an embodiment of the invention. A legend 1080 is provided in FIG. 10 as well. The transformation graph 1050 results from simulation of the transformation tree 1000, as indicated by the arrow 1082. The transformation tree 1000 has tree nodes 1002A, 1002B, 1002C, 1002D, 1002E, 1002F, 1002G, and 1002H, collectively referred to as the nodes 1002, and which are connected by tree edges represented by arrows in FIG. 10. Similarly, the transformation graph 1050 has graph nodes 1052A and 1052B, collectively referred to as the nodes 1052, and which are connected by graph edges represented by arrows in FIG. 10.

The state of each node in FIG. 10 is represented by the combination of three classes of information. The first class of information is the sequence of API calls denoted in <and>. The second class of information includes the active properties in each DOM state denoted in [and]. In this example, the number of the "onclick" event handler is employed as the active property, but other conditions may also be specified. The third class of information is document similarity denoted in (and). In this example, document similarity is assessed by detecting the presence of a table element.

Figure 11:
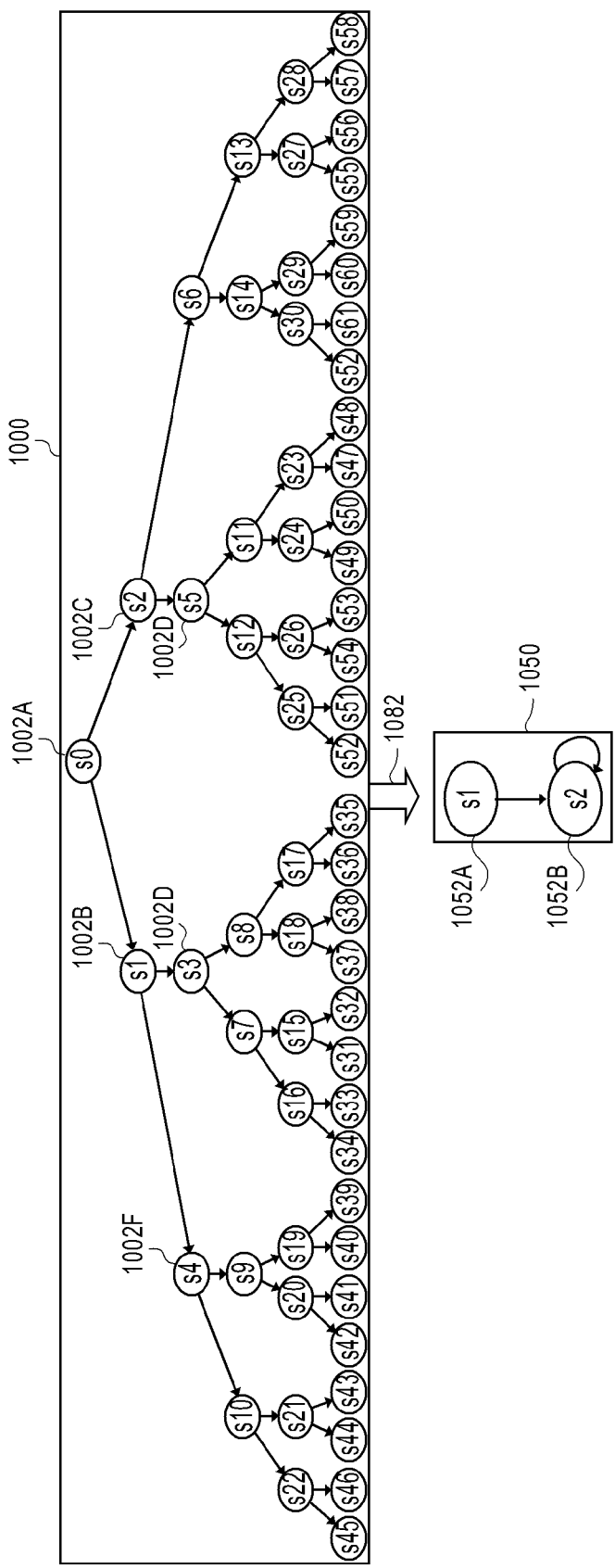
FIG. 11 is a diagram depicting how the transformation graph of FIG. 10 merges all the tree nodes of the transformation tree of FIG. 9 into two graph nodes, according to an embodiment of the present invention.

FIG. 11 shows how the transformation graph 1050 resulting from simulation of the transformation tree 1000 (as noted by the arrow 1082) greatly simplifies the DOM state nodes, according to an embodiment of the invention. In particular, all the nodes of the transformation tree 1000, include some of the nodes 1002 of FIG. 10, are merged to just the two nodes 1052 of the transformation graph 1050. As a result, the crawl-oriented actions have to be performed on just two graph nodes 1052 of the transformation graph 1050, as opposed to a significantly larger (and potentially infinitely expanding) set of tree nodes of the transformation tree 1000.

Figure 12:
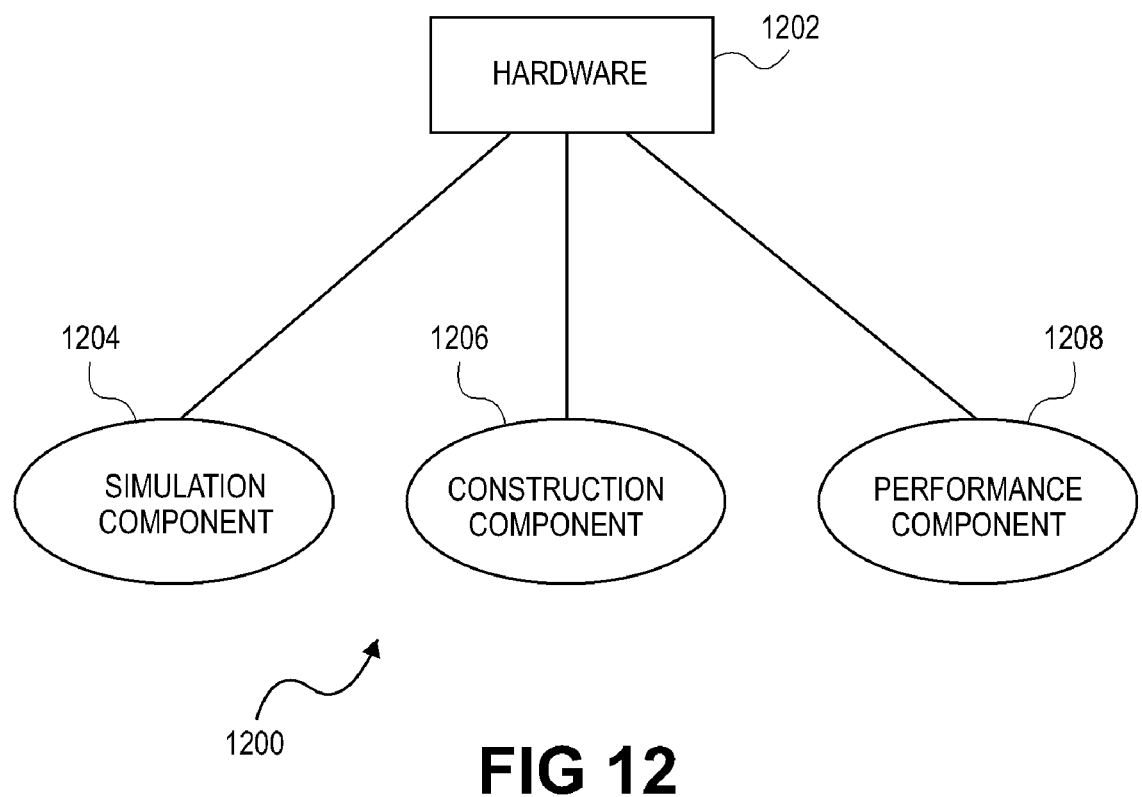
FIG. 12 is a diagram of a system, according to an embodiment of the invention.

In conclusion, FIG. 12 shows a rudimentary computerized system 1200, according to an embodiment of the invention. The computerized system 1200 may be implemented over one or more computing devices. The system 1200 includes hardware 1202. The hardware 1202 may include processors, memory, storage devices, and other types of hardware, as can be appreciated by those of ordinary skill within the art. The system 1200 further includes a simulation component 1204, a construction component 1206, and a performance component 1208, each of which is implemented on or by the hardware 1202, such as one or more computer programs and/or computer-executable instructions that program the hardware 1202.

The simulation component 1204 is to simulate a transformation tree for an object model, as has been described. The simulation component 1204 may initially define the transformation tree prior to simulating the tree. The component 1204 may thus perform part 302 of the method 300 of FIG. 3, as well as a portion of part 304 of the method 300. The construction component 1206 is to construct a transformation graph for the object model, as has been described, based on the transformation tree that has been simulated by the simulation component 1204. The component 1206 may thus perform a portion of part 304 of the method 300, as well as the method 500 of FIG. 5. The performance component 1208 performs crawling-oriented actions in relation to the object model by performing these actions in relation to or on the transformation graph that has been constructed for the model, as has been described. The component 1208 also displays the results of these actions. As such, the performance component 1208 may perform parts 306 and 308 of the method 300.

It is finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method executed by a processor and comprising:
    defining a transformation tree for an object model, the transformation tree having a plurality of tree nodes connected to one another by a plurality of tree edges, the transformation tree being a directed acyclic graph in which each tree node is connected to at most one other tree node, each tree node corresponding to a state of the object model, each tree edge corresponding to an event causing the object model to transition from a state of one tree node to a state of another tree node;
    constructing a transformation graph for the object model by simulating the transformation tree for the object model, the transformation graph having a plurality of graph nodes connected to one another by a plurality of graph edges, the transformation graph being a directed graph in which each graph node is connected to one or more other graph nodes, each graph node corresponding to a state of the object model, each graph edge corresponding to an event causing the object model to transition from a state of one graph node to a state of another graph node;
    performing one or more crawling-oriented actions in relation to the object model by performing the crawling-oriented actions in relation to the transformation graph for the object model that has been constructed; and,
    displaying results of the crawling-oriented actions performed in relation to the object model,
    wherein the transformation graph is different from the transformation tree.

2. The method of claim 1, wherein constructing the transformation graph for the object model comprises evaluating a state of the object model to which a graph node corresponds and returning a label representing characteristics of the state.

3. The method of claim 2, wherein constructing the transformation graph for the object model further comprises determining whether the characteristics of the state of a first graph node is similar to the characteristics of the state of a second graph node, where the state of the first graph node is similar to the state of the second graph node where one or more conditions are true, the conditions comprising:
    active properties of a web page corresponding to the state of the object model represented by the first graph node are similar to active properties of a web page corresponding to the state of the object model represented by the second graph node;
    a structure of the object model within the state of the first graph node is similar to a structure of the object model within the state of the second graph node;
    the state of the first graph node resulted from script execution similar to script execution resulting in the state of the second graph node.

4. The method of claim 3, wherein constructing the transformation graph for the object model further comprises merging graph nodes representing similar states of the object model.

5. The method of claim 1, wherein constructing the transformation graph for the object model comprises constructing the transformation graph until a predetermined number of iterations of node generations of the transformation graph have been achieved.

6. The method of claim 1, wherein constructing the transformation graph for the object model comprises constructing the transformation graph until a predetermined number of states of the object model have been simulated.

7. The method of claim 1, wherein the object model is one of:
    a document object model (DOM) representing a dynamic web site; and,
    a programming language model for a self-mutating computer program.

8. A non-transitory computer-readable medium having stored thereon:
    computer-executable instructions for defining a transformation tree for a document object model (DOM) representing a dynamic web site, the transformation tree having a plurality of tree nodes connected to one another by a plurality of tree edges, the transformation tree being a directed acyclic graph in which each tree node is connected to at most one other tree node, each tree node corresponding to a state of the DOM, each tree edge corresponding to an event causing the DOM to transition from a state of one tree node to a state of another tree node;
    computer-executable instructions for constructing a transformation graph for the DOM by simulating the transformation tree for the DOM, the transformation graph having a plurality of graph nodes connected to one another by a plurality of graph edges, the transformation graph being a directed graph in which each graph node is connected to one or more other graph nodes, each graph node corresponding to a state of the DOM, each graph edge corresponding to an event causing the DOM to transition from a state of one graph node to a state of another graph node; and, computer-executable instructions for performing one or more crawling-oriented actions in relation to the DOM by performing the crawling-oriented actions in relation to the transformation graph for the DOM that has been constructed, and for displaying results of the crawling-oriented actions performed in relation to the DOM, wherein the transformation graph is different from the transformation tree.

9. The computer-readable medium of claim 8, wherein constructing the transformation graph for the DOM comprises evaluating a state of DOM to which a graph node corresponds and returning a label representing characteristics of the state.

10. The computer-readable medium of claim 9, wherein constructing the transformation graph for the DOM further comprises determining whether the characteristics of the state of a first graph node is similar to the characteristics of the state of a second graph node.

11. The computer-readable medium of claim 10, wherein constructing the transformation graph for the DOM further comprises merging graph nodes representing similar states of the DOM.

12. The computer-readable medium of claim 10, wherein the state of the first graph node is similar to the state of the second graph node where one or more conditions are true, the conditions comprising:

active properties of a web page corresponding to the state of the DOM represented by the first graph node are similar to active properties of a web page corresponding to the state of the DOM represented by the second graph node;

a structure of the DOM within the state of the first graph node is similar to a structure of the DOM within the state of the second graph node;

the state of the first graph node resulted from script execution similar to script execution resulting in the state of the second graph node.

13. The computer-readable medium of claim 8, wherein constructing the transformation graph for the DOM comprises constructing the transformation graph until a predetermined number of iterations of node generations of the transformation graph have been achieved.

14. The computer-readable medium of claim 8, wherein constructing the transformation graph for the DOM comprises constructing the transformation graph until a predetermined number of states of the DOM have been simulated.

15. The computer-readable medium of claim 8, wherein the event of each graph edge corresponds to a user-initiated JavaScript event and an intrinsic event such as a timer event.

16. The computer-readable medium of claim 8, wherein the crawling-oriented actions comprise testing security vulnerabilities of the dynamic web site.

17. A computerized system comprising:

hardware including one or more of a processor and a memory;

a simulation component implemented via the hardware to simulate a transformation tree for an object model, the transformation tree having a plurality of tree nodes connected to one another by a plurality of tree edges, the transformation tree being a directed acyclic graph in which each tree node is connected to at most one other tree node, each tree node corresponding to a state of the object model, each tree edge corresponding to an event causing the object model to transition from a state of one tree node to a state of another tree node; and, a construction component implemented via the hardware to construct a transformation graph for the object model based on the transformation tree for the object model being simulated by the simulation component, the transformation graph having a plurality of graph nodes connected to one another by a plurality of graph edges, the transformation graph being a directed graph in which each graph node is connected to one or more other graph nodes, each graph node corresponding to a state of the object model, each graph edge corresponding to an event causing the object model to transition from a state of one graph node to a state of another graph node, wherein the transformation graph is different from the transformation tree.

18. The computerized system of claim 17, further comprising a performance component implemented via the hardware to perform one or more crawling-oriented actions in relation to the object model by performing the crawling-oriented actions in relation to the transformation graph for the object model that has been constructed, and to display results of the crawling-oriented actions performed in relation to the object model.

19. The computerized system of claim 17, wherein the construction component is to evaluate a state of the object model to which a graph node corresponds and to return a label representing characteristics of the state.

20. The computerized system of claim 19, wherein the construction component comprises a merging sub-component to determine whether the characteristics of the state of a first graph node is similar to the characteristics of the state of a second graph node, and to merge the first graph node with the second graph node where the first and the second graph nodes represent similar states of the object model.

* * * * *